United States Patent [19]

Sinyakov

[11] Patent Number: 5,732,997
[45] Date of Patent: Mar. 31, 1998

[54] DEVICE FOR INCREASING A RESTING SPACE FOR DRIVERS IN A TRUCK

[76] Inventor: Aleksander Sinyakov, 8841 20th Ave., #1A, Brooklyn, N.Y. 11214

[21] Appl. No.: 706,827

[22] Filed: Sep. 3, 1996

[51] Int. Cl.[6] .................................................. B60J 5/00
[52] U.S. Cl. .................. 296/97.7; 296/97.8; 160/370.22
[58] Field of Search .............................. 296/97.7, 97.8, 296/97.9, 95.1, 136; 160/370.21, 370.22, DIG. 3

[56] References Cited

U.S. PATENT DOCUMENTS

| | | | |
|---|---|---|---|
| 4,109,957 | 8/1978 | Polizzi et al. | 296/95.1 |
| 4,790,591 | 12/1988 | Miller | 296/97.7 X |
| 4,799,728 | 1/1989 | Akers et al. | 296/95.1 X |
| 4,883,304 | 11/1989 | Elliott | 296/97.8 |
| 4,947,920 | 8/1990 | Moll | 296/97.8 X |
| 5,038,844 | 8/1991 | Edmonds et al. | 296/97.8 X |
| 5,064,239 | 11/1991 | Folcik | 296/97.7 |
| 5,121,957 | 6/1992 | O'Shea | 296/95.1 X |
| 5,364,155 | 11/1994 | Kueahar et al. | 296/136 |
| 5,409,286 | 4/1995 | Huang | 296/136 |

*Primary Examiner*—Joseph D. Pape
*Attorney, Agent, or Firm*—Ilya Zborovsky

[57] ABSTRACT

A device for increasing a resting space for drivers has a blocking element movable between a closable position in which it covers at least a portion of a windshield and side windows of a vehicle and an unblocking position in which it does not cover the same and removed, first connecting elements arranged on an outer surface of the blocking element, second connecting elements attachable to an inner surface of a driver's cabin, the first and second connecting elements being formed with a plurality of interengaging projections so that when the blocking element is in the closing position the first connecting elements and the second connecting elements can engage with one another and firmly hold the blocking element in the closing position inwardly and over at least a part of the windshield and the side windows.

2 Claims, 2 Drawing Sheets

DEVICE FOR INCREASING A RESTING SPACE FOR DRIVERS IN A TRUCK

BACKGROUND OF THE INVENTION

The present invention relates to screen devices for trucks, preferably to heavy-duty trucks with sleepers for long distance travels.

In the heavy-duty trucks for long distance travels it is conventional to provide, in addition to the driver's cabin, also a sleeper or in other words an additional compartment located behind the driver's cabin as considered in the traveling direction. When one drive drives the truck, the second driver can use the sleeper for sleeping and resting. There are substantial periods of time when the trucks are not driven. During these periods of time, the sleepers are also used for sleeping, resting, etc. However, the sleeper has a limited space, and of course it would be advisable to increase this space for example by using the interior space of the cabin as well. This is not possible in the existing trucks since the windshield and the side windows of the driver's cabin are not provided with any light-devices. Therefore, if a driver attempts to use both the space inside the sleeper and the space inside the cabin, he is exposed inside the cabin space to sunlight during daytime, to light of oncoming traffic during nighttime, the observation by passers-by or passing truck and car drivers, etc. Thus, actually, the sleeper's space for sleeping, resting, etc. cannot be practically extended by the space of the driver's cabin.

It is known to cover the windshield with sheets which are unrolled, and then rolled back after the use. However, the elements used for this purpose block the light only through the windshield, for preventing excessive warming inside the driver's cabin. They are not capable of completely blocking the interior of the cabin from light, outside observation, etc. so as to expand the resting space of the sleepers. Also, stationary covers are known which are arranged in receiving elements mounted in the driver's cabin and then unrolled to cover the windshield and the side windows. However, they are not portable and can not be moved from one truck to the other, or sold in stores seperately from the vehicles to be installed on existing vehicles.

SUMMARY OF THE INVENTION

Accordingly, it is an object of the present invention to provide a device for expanding a resting space, which avoids the disadvantages of the prior art.

In keeping with these objects and with others which will become apparent hereinafter, one feature of present invention resides, briefly stated, in a device for expanding a resting space in a truck and the like, which has at least one light and heat blocking element which is substantially light-impermeable, and is provided with first of connecting means formed with a plurality of projections engageable with projections of second connecting means attachable to a windshield and side windows of the driver's cabin, and the first and second connecting means when connected with one another hold the device on the windshield and the side windows, and can be disconnected from one another so as to remove the device.

When the device is designed in accordance with present invention, it is efficient in blocking the light and heat in its operative position, and at the same time, it can be easily removed, folded, and transported.

In accordance with an additional feature of the present invention, additional connecting means are provided on an opposite side of the device, so that when the device is wound to form a roll, one of the first and second connecting means can engage the additional connecting means, and the device can be retained in the wound condition.

In accordance with still another feature of present invention, a bag-shaped element is attached to the device, so that the device can be folded and inserted in the bag-shaped element.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
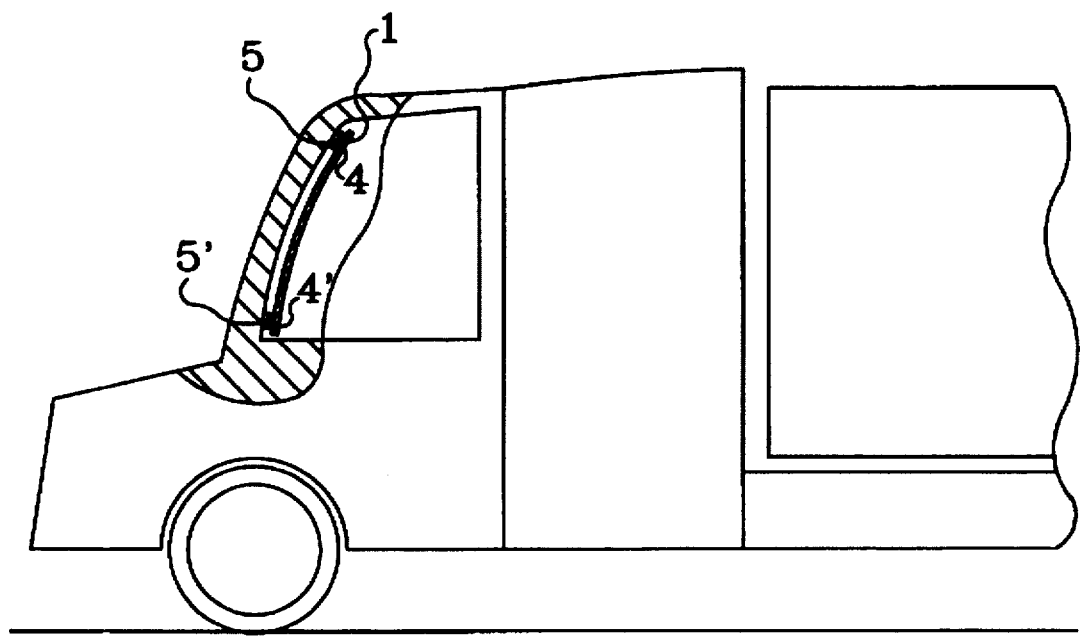
FIG. 1 is a side view of a truck with a driver's cabin provided with an inventive device, in a section.
Figure 2:
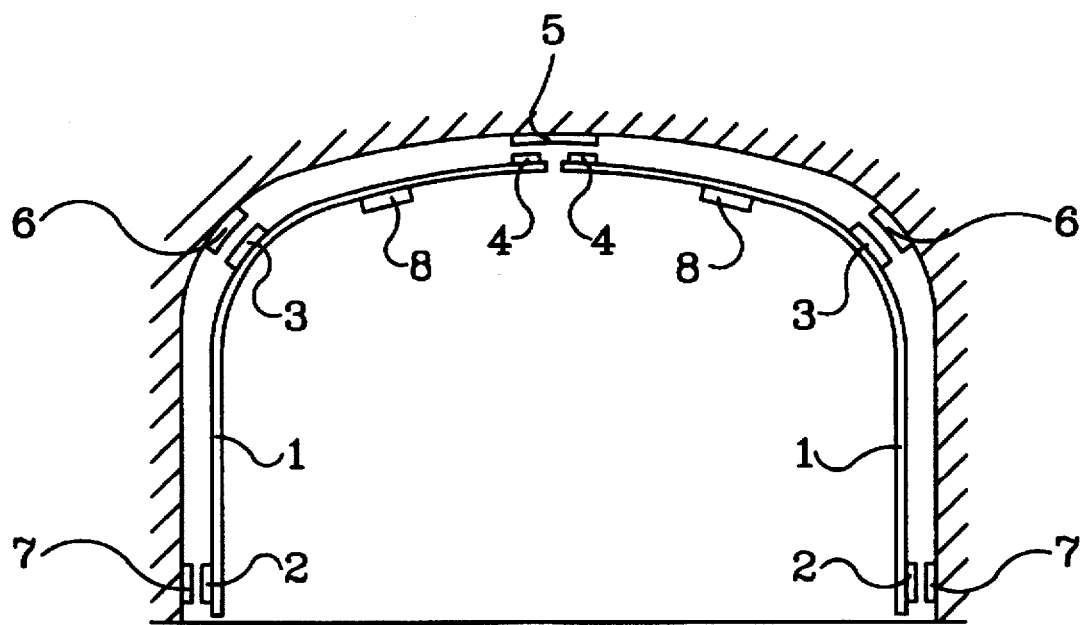
FIG. 2 is a plan view schematically showing a driver's cabin with a light device in accordance with the present invention in an operative position.

A device in accordance with the present invention has two blocking elements each identified as a whole with reference numeral 1. Each blocking element 1 can be formed as a blind-like element having light-blocking functions and/or heat blocking functions. For this purpose, it is composed of a material which is light impermeable, and preferably not inflammable, and also is thermally insulating, such as for example fabric, plastic and the like which satisfies these requirements.

Each blocking element 1 has a plurality of first connecting elements identified with reference numerals 2, 3 and 4. The first connecting elements 2 and 4 are arranged on the ends of the blocking element 1, while the third connecting element 3 is arranged in the area between the first connecting elements 2 and 4. The device further has second connecting elements identified with reference numerals 5, 6 and 7. They are attachable to the inner surface of the driver's cabin. The second connecting element 5 is located in the region of the first connecting element 2, the second connecting elements 6 are located in the region of the first connecting elements 3, and the second connecting elements 7 are located in the regions of the first connecting elements 4. The second connecting elements 5, 6, 7 have outer surfaces which are attached to the inner surface of the driver's cabin, for example above the windshield and the side windows, by adhesive, or the like. The first connecting elements 2, 3 and 4 are attached with their inner surfaces to the outer surfaces of the blocking elements 1, for example, by adhesive, by sewing. The facing surfaces of the first connecting elements 2, 3, 4 and the second connecting elements 5, 6, 7 are provided with a plurality of engaging formations which can engage with one another, such as for example with small hooks and loops which form a well known VELCRO connection.

When it is necessary to cover the windshield and the side windows in the driver's cabin, a user attaches to blocking elements 1 to the windshield and the side windows by pressing the first connecting elements 2, 3, 4 against the second connecting elements 5, 6, 7 so as to provide their inter engagement. The blocking elements 1 are thereby reliably held in the upright position, covering the windshield and the side windows from inside. The blocking elements 1 can be removed from the driver's cabin by pulling them away from the second connecting elements 5, 6, 7.

Figure 3:
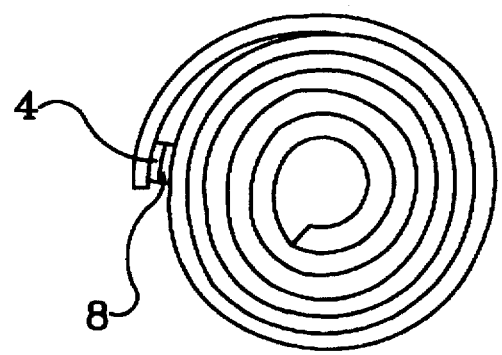
FIG. 3 is a view showing the device in an inoperative position in which it is wound in a roll and fixed.

In accordance with a further embodiment of the invention, additional connecting elements 8 are provided on the inner surface of the blocking elements 1 and connected with them also for example by adhesion, sewing, etc. As shown in FIG. 3, when the blocking element 1 is removed and wound to form a roll, the connecting element 8, which is provided also with corresponding engaging formations of VELCRO type, can be connected with the first connecting element 2 so as to fix the roll in the wound position. The thusly rolled locking element can be easily transported.

Figure 4:
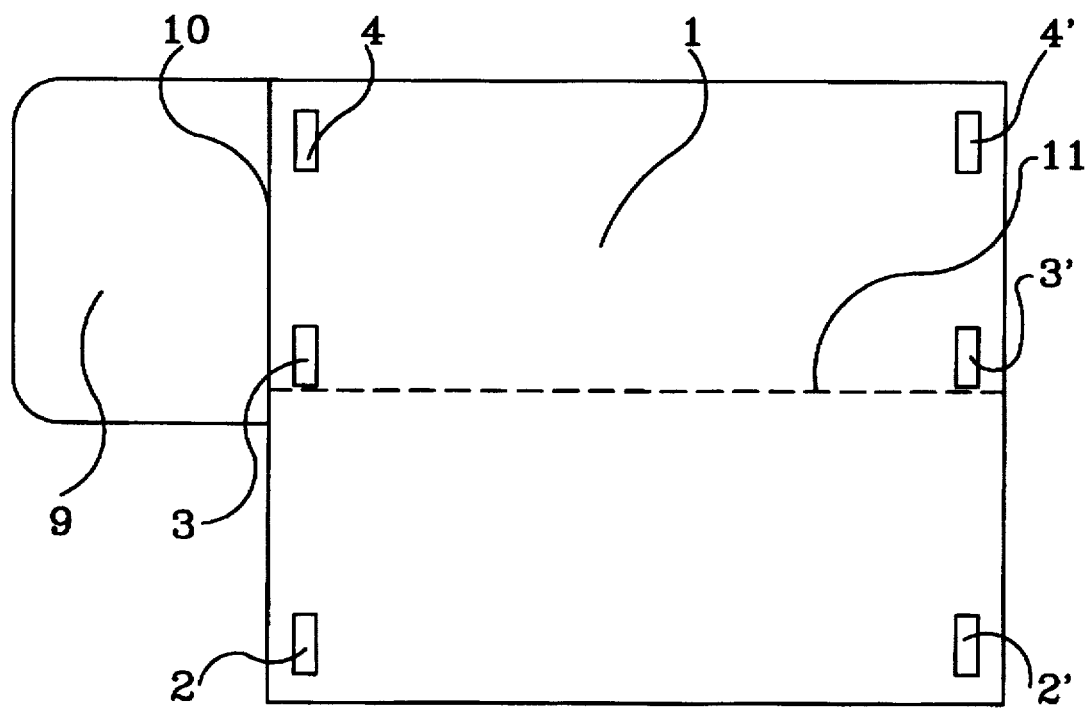
FIG. 4 is a view showing a further embodiment of the inventive device.

In accordance with a further embodiment shown in FIG. 4, an additional bag-like element 9 is attached to the blocking element 1, for example by sewing. The bag-like element 2 has two walls spaced from one another as considered in the direction perpendicular to the drawing of FIG. 4. One of the walls is attached to the blocking element 1, and an inlet opening 10 is formed between the walls 9 in the area facing the blocking element 1. The blocking element 1 can be folded in half along the line 11 to form two layers, and then rolled in the direction identified with the arrow A to form a roll, which finally can be inserted into the bag-like element.

When the blocking device is designed in accordance with the present invention, it is very efficient in blocking light from outside, and also blocking heat from outside to maintain cool air in the driver's cabin. At the same time it is portable, transportable, and is easy to handle.

While in the illustrated embodiment the connecting means are located near the upper edge of the blocking elements and above the upper edge of the windshield and the side windows correspondingly, it is also possible to provide additional connecting means at the lower edge of the blocking elements and below the lower edge of the windshield and the side windows as shown in FIGS. 1 and 4 and identified with the same reference numerals with the addition of primes.

It will be understood that each of the elements described above, or two or more together, may also find a useful application in other types of constructions differing from the types described above.

While the invention has been illustrated and described as embodied in device for increasing a resting space for drivers in a truck, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for increasing a resting space for drivers, comprising a blocking element movable between a closable position in which it covers at least a portion of a windshield and side windows of a vehicle and an unblocking position in which it does not cover the same and removed; a plurality of first connecting elements arranged on an outer surface of said blocking element and spaced from one another in two opposite directions; a plurality of second connecting elements attachable to an inner surface of a driver's cabin, said first and second connecting elements being provided with a plurality of interengaging projections formed as hooks and loops so that when said blocking element is in said closing position said first connecting elements and said second connecting elements can engage with one another by hooks and loops and firmly hold said blocking element in said closing position inwardly and over at least a part of the windshield and the side windows, said blocking element including two blocking members each adapted to cover substantially a half of the windshield and one side window and provided with a plurality of said first connecting elements, said second connecting elements including at least one second connecting element which is attachable to the windshield and is coextensive with at least two first connecting elements, so that one of said first connecting elements of one of said blocking members and one of said first connecting elements of the other of said blocking members which are located close to one another are connectable with said one second connecting element in the closeable position.

2. A device for increasing a resting space for drivers, comprising a blocking element movable between a closable position in which it covers at least a portion of a windshield and side windows of a vehicle and an unblocking position in which it does not cover the same and removed; a plurality of first connecting elements arranged on an outer surface of said blocking element and spaced from one another in two opposite directions; a plurality of second connecting elements attachable to an inner surface of a driver's cabin, said first and second connecting elements being provided with a plurality of interengaging projections formed as hooks and loops so that when said blocking element is in said closing position said first connecting elements and said second connecting elements can engage with one another by hooks and loops and firmly hold said blocking element in said closing position inwardly and over at least a part of the windshield and the side windows, said blocking element being provided with at least one additional connecting element arranged on a surface which is opposite to a surface on which said first connecting elements are arranged and provided with a plurality of projections selected from the group consisting of hooks and loops, so that when said blocking element is wound to form a roll, said projections of said additional connecting element are engage able with said projections of one of said first connecting elements so as to fix the roll and to prevents its unwinding.

\* \* \* \* \*